UNITED STATES PATENT OFFICE.

WILLIAM GODSON LINDSAY, OF NEWARK, NEW JERSEY, ASSIGNOR TO THE CELLULOID COMPANY, A CORPORATION OF NEW JERSEY.

ACETYL CELLULOSE AND PROCESS OF MAKING THE SAME.

1,338,661.      Specification of Letters Patent.      Patented Apr. 27, 1920.

No Drawing. Original application filed April 8, 1911, Serial No. 619,685. Patent No. 1,236,578, dated August 14, 1917. Divided and application filed July 11, 1914, Serial No. 850,431. Patent No. 1,265,216, dated May 7, 1918. Divided and this application filed April 9, 1918. Serial No. 227,488.

*To all whom it may concern:*

Be it known that I, WILLIAM GODSON LINDSAY, a citizen of the United States, residing at Newark, in the county of Essex and State of New Jersey, have invented certain new and useful Improvements in Acetyl Cellulose and Processes of Making the Same, of which the following is a specification.

This application relates to acetyl cellulose and a process of making the same. This application is a division of my application, Serial No. 850,431, filed July 11, 1914, which as eventuated in Patent No. 1,265,216, dated May 7, 1918, and which in turn was a division of my application, Serial No. 619,685, filed April 8, 1911, which has eventuated as Patent No. 1,236,578, dated August 14, 1917. It is well known that, while acetyl cellulose is a desirable substance for replacing nitrocellulose in many applications, the special difficulties connected with its manufacture have, in large part, prevented its adoption for practical purposes. The acetylation of cellulose is so sensitive to the influence of acetylizing mixtures and physical conditions that up to the present time it has been hard to produce a definite and uniform product.

The principal difficulty has been the production of acetyl cellulose having a conserved strength of fiber and such a definite solubility as would fit it for use with certain solvents, or for application to particular purposes in the arts.

Previous to my invention the products of the various processes proposed have been strictly circumscribed because of their defects or practical limitations. For example, the acetyl cellulose would be in one case limited to the amorphous form and a definite solubility. In another case the form would be similarly limited, but the solubility would have a wider range. In another case the result would be a fibrous acetyl cellulose, but weak and brittle. In still another case there would be a better conservation of the fibrous form, but a limited solubility or degree of acetylization.

The varying steps of manufacture are, therefore, of extraordinary importance, as they so strongly affect the final character of the acetyl cellulose. The process which I propose produces acetyl cellulose having new characteristics. In practice I proceed as follows:

Cellulose, preferably a high grade bleached cotton, is given a preliminary treatment with acetic acid of about 75% to 98% until the cotton is thoroughly impregnated. The mixture of cotton and acetic acid is then introduced into the acetylizing mixture consisting of acetic anhydrid, sulfuric acid and benzene, the temperature being from 50° to 60° F., and under certain circumstances 80° F. The temperature of the reaction mixture gradually rises and is then usually maintained at from 70° to 80° F., until the reaction is completed. This takes from 24 to 30 hours, depending upon the rate of acetylization. By this means I obtain fibrous acetyl cellulose, having a wide range of solubility, such solubility being varied according to the minor conditions of operating hereinafter described.

To some extent I control the solubility of my product, either by changing the strength of the acetic acid used in the preliminary bath, or by varying the amount of acid used in proportion to the fiber. For example, when using about 200 parts of acid to 100 parts of fiber, I employ acetic acid varying from about 75% to 98%. When using an 85% acetic acid as a constant strength I employ, say, from about 70 to 250 parts to each 100 parts of the fiber. By this means I can produce an acetyl cellulose soluble in a mixture of chloroform and alcohol, but incompletely soluble in chloroform alone; or a variety which is quite viscous in acetone, or one which produces more fluid solutions. Some of my acetyl cellulose is freely soluble in acetylene tetrachlorid, while some requires the addition of alcohol before the acetylene tetrachlorid will make a complete solution.

I also vary the solubility in different solvents by changes in the proportion of sulfuric acid in the acetylizing mixture, and also by means of time of contact and the temperature, as is generally understood.

So far as I can ascertain, the preliminary treatment above described produces no chemical effect upon the fiber, but simply puts it into a better condition for the subsequent reaction. In other words, when the fiber enters the acetylizing mixture it is still ordinary cellulose.

I have also discovered certain equivalents of the acetic acid for my preliminary treatment. For example, if the water in the acetic acid be replaced by alcohol, either ethyl or methyl, the effect is apparently the same. Or, in place of the acetic acid, I can use a mixture of benzene and ethyl or methyl alcohol, in which case the benzene will represent the pure acetic acid, and the alcohol will represent the water. Or the acetic acid can be replaced by ethyl acetate of similar strength; or I may use, say, a mixture of ethyl acetate and either ethyl or methyl alcohol, in which case ethyl acetate replaces the pure acetic acid and the alcohols act in place of the water. In fact, in place of this acetic acid I can use any substance whatever, so long as such substance acts in a similar way to protect the cotton fiber from the initial violent attack of the acetylizing mixture. This protection is afforded by what might be called a diluting or shielding of the cotton fiber by means of a liquid that is compatible, but nevertheless does not readily react with acetic anhydrid and sulfuric acid, but tends to regulate or prolong the initial reaction. Water alone would not be such a liquid, because it would increase the violence of the first attack.

In order to still further instruct the operator, I give the following proportions and conditions as a specific example of my improved process. Upon 100 parts by weight of pure cotton rovings is poured 200 parts of 90% acetic acid. After the acid has become uniformly spread throughout the mass, the mixture is introduced into a bath consisting of 600 parts of acetic anhydrid, 25 parts of 96% sulfuric acid, and 1400 parts of benzene, at a temperature of about 50° F. The acetylation is then allowed to proceed at a temperature of about 70° F. for twenty-four hours, at the end of which time, if the condition given be properly observed, a test portion should be soluble in a mixture of acetylene tetrachlorid and alcohol, dichlorhydrin, epichlorhydrin, or nitrobenzene.

The excess of the reaction mixture is then removed by any suitable means; for example, by whizzing or by pressing. The acetyl cellulose is then immersed for one hour in a hot solution of calcium nitrate (consisting of about one pound to the gallon), after which it is thoroughly washed, preferably in hot and then in cold water, and then dried.

The object of this treatment with calcium nitrate is to remove any free sulfuric acid adhering to the fiber, and also to neutralize any sulfonic acid ester that might accompany the formation of the acetyl cellulose.

The acetyl cellulose produced in this particular instance is in appearance, quite similar to nitrated cotton in which the strength of the fiber has been retained. That is, it is harsh to the touch and practically as strong as the original cotton fiber. It can be dissolved in a mixture of acetylene tetrachlorid and alcohol or in a mixture of chloroform and alcohol to form a flowable solution suitable for the manufacture of thin sheets, or, after being rendered plastic by the addition of the solvents mentioned, it can be manipulated so as to produce other forms.

The acetyl cellulose made by the formula just described has an increase from the cellulose to the final product of about 65%. In general, the increase of weight bears some relation to variations in solubility, and depends upon the character of the first solution and the conditions of acetylization. In practice the increase obtained by my process has varied from 50% to 80% and even higher.

As to this influence of the acetylizing mixture and the conditions of acetylization, I might add that increase in weight is produced by prolonged reaction. The temperature will also have its effect. But in all cases the influence of the acetic acid into which the cotton is first immersed is greater than the effect of the acetylizing mixture, or time and temperature. I therefore call the operator's attention especially to the importance of this first step in my process.

The proportion of sulfuric acid in the acetylizing mixture is also of some importance in controlling the variety of acetyl celulose produced. While I prefer to use cellulose in the form of cotton, it is understood, of course, that I can use other vegetable fibers suitably prepared.

The acetyl cellulose made by my process does not consist of any one variety or degree of acetylation. It is not, for example, di-, or tri- or tetraacetyl cellulose. And this very mixture or combination is of great practical importance, as furnishing products specially suitable for industrial applications.

Having thus described my invention, I declare that what I claim as new and desire to secure by Letters Patent is:

1. The process of producing acetyl cellulose, which consists in treating cellulose with benzene and alcohol, and then subjecting the impregnated cellulose to an acetylizing mixture containing acetic anhydrid and benzene.

2. The process of producing acetyl cellulose, which consists in treating cellulose with benzene and alcohol, and subjecting the impregnated cellulose to an acetylizing mixture.

WILLIAM GODSON LINDSAY.